(12) United States Patent
Lim et al.

(10) Patent No.: US 12,644,603 B2
(45) Date of Patent: Jun. 2, 2026

(54) COMBUSTOR NOZZLE, COMBUSTOR, AND GAS TURBINE INCLUDING SAME

(71) Applicant: DOOSAN ENERBILITY CO., LTD., Changwon-si (KR)

(72) Inventors: Joong Hyun Lim, Changwon-si (KR); Young Gun Go, Yongin-si (KR); Kyoung Taek Oh, Hwaseong-si (KR); Sang Pil Jo, Sejong-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 4 days.

(21) Appl. No.: 18/917,649

(22) Filed: Oct. 16, 2024

(65) Prior Publication Data

US 2025/0189134 A1 Jun. 12, 2025

(30) Foreign Application Priority Data

Dec. 8, 2023 (KR) ........................ 10-2023-0177751

(51) Int. Cl.
| | |
|---|---|
| *F23R 3/00* | (2006.01) |
| *F02C 7/22* | (2006.01) |
| *F23R 3/28* | (2006.01) |

(52) U.S. Cl.
CPC ................ *F23R 3/286* (2013.01); *F02C 7/22* (2013.01)

(58) Field of Classification Search
None
See application file for complete search history.

(56) References Cited

U.S. PATENT DOCUMENTS

| | | | | |
|---|---|---|---|---|
| 5,284,438 A | * | 2/1994 | McGill | ................... F23C 9/006 |
| | | | | 431/9 |
| 8,438,851 B1 | * | 5/2013 | Uhm | ....................... F23R 3/286 |
| | | | | 60/737 |
| 2002/0192615 A1 | * | 12/2002 | Moriya | ................... F23D 14/02 |
| | | | | 431/278 |

(Continued)

FOREIGN PATENT DOCUMENTS

| | | |
|---|---|---|
| CN | 106678875 A | 5/2017 |
| JP | S6082724 A | 5/1985 |

(Continued)

OTHER PUBLICATIONS

Extended European Search Report mailed Apr. 1, 2025 for EP application No. 24211033.6, 8 pages.

*Primary Examiner* — Edwin Kang
(74) *Attorney, Agent, or Firm* — Shook, Hardy & Bacon L.L.P.

(57) ABSTRACT

A combustor nozzle includes a plurality of mixing tubes through which air and fuel flow, a plurality of accommodation tubes each accommodating and supporting the plurality of mixing tubes therein, a first fuel tube coupled to each accommodation tube to supply a first fuel into the accommodation tube, a second fuel tube coupled to each accommodation tube to supply a second fuel into the accommodation tube, a dispersion chamber provided in each accommodation tube so as to be combined with the second fuel tube to receive the second fuel therein, a first fuel supply member supplying the first fuel received in each accommodation tube into each mixing tube, and a second fuel supply member supplying the second fuel received in the dispersion chamber into each mixing tube.

12 Claims, 9 Drawing Sheets

(56)                  References Cited

U.S. PATENT DOCUMENTS

| | | |
|---|---|---|
| 2011/0083439 A1 | 4/2011 | Zuo et al. |
| 2013/0074510 A1 | 3/2013 | Berry |
| 2013/0232979 A1* | 9/2013 | Singh ...................... F23R 3/286 |
| | | 60/737 |
| 2013/0239581 A1 | 9/2013 | Johnson et al. |
| 2016/0186663 A1* | 6/2016 | Stewart ................... F23R 3/286 |
| | | 60/737 |
| 2023/0213195 A1 | 7/2023 | Kim |
| 2023/0266011 A1 | 8/2023 | Shershnyov |

FOREIGN PATENT DOCUMENTS

| | | |
|---|---|---|
| JP | 2011-080743 A | 4/2011 |
| JP | 2013-181744 A | 9/2013 |
| JP | 2013245598 A | 12/2013 |
| JP | 2013-190201 A | 9/2019 |
| JP | 2021055644 A | 4/2021 |
| KR | 2016-0023658 A | 3/2016 |
| KR | 20160092939 A | 8/2016 |
| KR | 101986729 B1 | 6/2019 |
| KR | 2019-0128232 A | 11/2019 |
| KR | 2020-0027894 A | 3/2020 |
| KR | 2022-0038541 A | 3/2022 |
| KR | 102459999 B1 | 7/2022 |
| KR | 20230041227 A | 3/2023 |
| KR | 2023-0137107 A | 10/2023 |
| KR | 2023-0166766 A | 12/2023 |

* cited by examiner

*1420*   *1427*

*1420*   *1426*        *1471*   *1427*      *2300*        *2100*

*1460*   *1461*        *1470*

COMBUSTOR NOZZLE, COMBUSTOR, AND GAS TURBINE INCLUDING SAME

CROSS REFERENCE TO RELATED APPLICATION

The present application claims priority to Korean Patent Application No. 10-2023-0177751, filed on Dec. 8, 2023, the entire contents of which are incorporated herein for all purposes by this reference.

BACKGROUND

1. Technical Field

The present disclosure relates to a combustor nozzle, a combustor, and a gas turbine and, more particularly, to a combustor nozzle using hydrogen-containing fuel, a combustor, and a gas turbine including the same.

2. Description of the Background Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of fields such as generation of electricity, driving of mechanical units, etc.

Fuel is injected through nozzles disposed in respective combustors, wherein the fuel includes gaseous fuel and liquid fuel. In recent years, in order to suppress the emission of carbon dioxide, use of hydrogen fuel or a fuel containing hydrogen is recommended.

However, since hydrogen has a high combustion rate, when such fuels are burned with a gas turbine combustor, the flame formed in the gas turbine combustor approaches and heats the structure of the gas turbine combustor, thereby degrading the reliability of the gas turbine combustor.

To solve this problem, a combustor nozzle having multiple tubes is proposed in Unexamined Korean Patent Publication No. 10-2020-0027894 and others. The nozzle with multiple tubes is efficient for combustion of hydrogen by discharging fuel at a high speed, but when hydrocarbon-based fuel such as natural gas is supplied to the multiple tubes, the fuel is injected at an excessively high speed, causing the flame to escape from the nozzle. As a result, the combustor with multiple tubes has the problem of not being able to burn a wide variety of fuels.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a combustor nozzle capable of burning a variety of fuels other than hydrogen-based fuels, a combustor, and a gas turbine including the same.

An aspect of the present disclosure provides a combustor nozzle including: a plurality of mixing tubes through which air and fuel flow; a plurality of accommodation tubes each accommodating and supporting the plurality of mixing tubes therein; a first fuel tube coupled to each accommodation tube to supply a first fuel into the accommodation tube; a second fuel tube coupled to each accommodation tube to supply a second fuel into the accommodation tube; a dispersion chamber provided in each accommodation tube so as to be combined with the second fuel tube to receive the second fuel therein; a first fuel supply member supplying the first fuel received in each accommodation tube into each mixing tube; and a second fuel supply member supplying the second fuel received in the dispersion chamber into each mixing tube.

The second fuel supply member may form a concentrated fuel flow flowing along an inner circumferential wall of the mixing tube with a higher concentration of fuel than the surrounding.

Two or more second fuel supply members may be circumferentially provided on the mixing tube so as to be spaced apart from each other to form an annular concentrated fuel flow.

An outlet of the first fuel supply member may be disposed closer to the center of the mixing tube than an outlet of the second fuel supply member.

An outlet of the second fuel supply member may be located further downstream of the outlet of the first fuel supply member.

An inclined angle of a longitudinal extension line of the second fuel supply member with the inner circumferential wall of the mixing tube may be formed to be smaller than that of a longitudinal extension line of the first fuel supply member with the inner circumferential wall of the mixing tube.

The first fuel may include a hydrogen-based fuel having hydrogen as a major component or a hydrocarbon-based fuel having hydrocarbon as a major component, and the second fuel may include a hydrocarbon-based fuel having hydrocarbon as a major component.

The second fuel supply member may include a hole formed in the mixing tube, the hole being inclined downstream with respect to the radial direction of the mixing tube.

The second fuel supply member may include a tubular member having a first portion inclined downstream with respect to the radial direction of the mixing tube and a second portion bent from the first portion toward the longitudinal direction of the mixing tube.

The second fuel supply member may include a tubular member having a guide portion for injecting the second fuel toward the inner circumferential wall of the mixing tube.

The outlet of the second fuel supply member may be inclined at an acute angle with respect to the inner circumferential wall of the mixing tube.

Another aspect of the present disclosure provides a combustor including: a burner having a plurality of nozzles through which fuel and air are injected; and a duct assembly coupled to one side of the burner to allow the fuel and the air to be combusted therein and combustion gases to be transferred to a turbine, wherein the nozzle includes: a plurality of mixing tubes through which air and fuel flow; a plurality of accommodation tubes each accommodating and supporting the plurality of mixing tubes therein; a first fuel tube coupled to each accommodation tube to supply a first fuel into the accommodation tube; a second fuel tube coupled to each accommodation tube to supply a second fuel into the accommodation tube; a dispersion chamber provided in each accommodation tube so as to be combined with the second fuel tube to receive the second fuel therein; a first fuel supply member supplying the first fuel received in each accommodation tube into each mixing tube; and a second fuel supply member supplying the second fuel received in the dispersion chamber into each mixing tube.

The second fuel supply member may form a concentrated fuel flow flowing along an inner circumferential wall of the mixing tube with a higher concentration of fuel than the surrounding, wherein two or more second fuel supply members are circumferentially provided on the mixing tube so as to be spaced apart from each other to form an annular concentrated fuel flow.

An outlet of the first fuel supply member may be disposed closer to the center of the mixing tube than an outlet of the second fuel supply member.

An outlet of the second fuel supply member may be located further downstream of the outlet of the first fuel supply member.

An inclined angle of a longitudinal extension line of the second fuel supply member with the inner circumferential wall of the mixing tube may be formed to be smaller than that of a longitudinal extension line of the first fuel supply member with the inner circumferential wall of the mixing tube.

The first fuel may include a hydrogen-based fuel having hydrogen as a major component or a hydrocarbon-based fuel having hydrocarbon as a major component, and the second fuel may include a hydrocarbon-based fuel having hydrocarbon as a major component.

The second fuel supply member may include a hole formed in the mixing tube, the hole being inclined downstream with respect to the radial direction of the mixing tube.

The second fuel supply member may include a tubular member having a first portion inclined downstream with respect to the radial direction of the mixing tube and a second portion bent from the first portion toward the longitudinal direction of the mixing tube.

A further aspect of the present disclosure provides a gas turbine including: a compressor compressing an externally introduced air; a combustor mixing the compressed air from the compressor with fuel to produce a mixture and combusting the mixture; and a turbine having a plurality of turbine blades rotated by the combustion gases from the combustor, wherein the combustor includes: a burner having a plurality of nozzles through which fuel and air are injected; and a duct assembly coupled to one side of the burner to allow the fuel and the air to be combusted therein and combustion gases to be transferred to a turbine, wherein the nozzle includes: a plurality of mixing tubes through which air and fuel flow; a plurality of accommodation tubes each accommodating and supporting the plurality of mixing tubes therein; a first fuel tube coupled to each accommodation tube to supply a first fuel into the accommodation tube; a second fuel tube coupled to each accommodation tube to supply a second fuel into the accommodation tube; a dispersion chamber provided in each accommodation tube so as to be combined with the second fuel tube to receive the second fuel therein; a first fuel supply member supplying the first fuel received in each accommodation tube into each mixing tube; and a second fuel supply member supplying the second fuel received in the dispersion chamber into each mixing tube.

DETAILED DESCRIPTION

Figure 1:
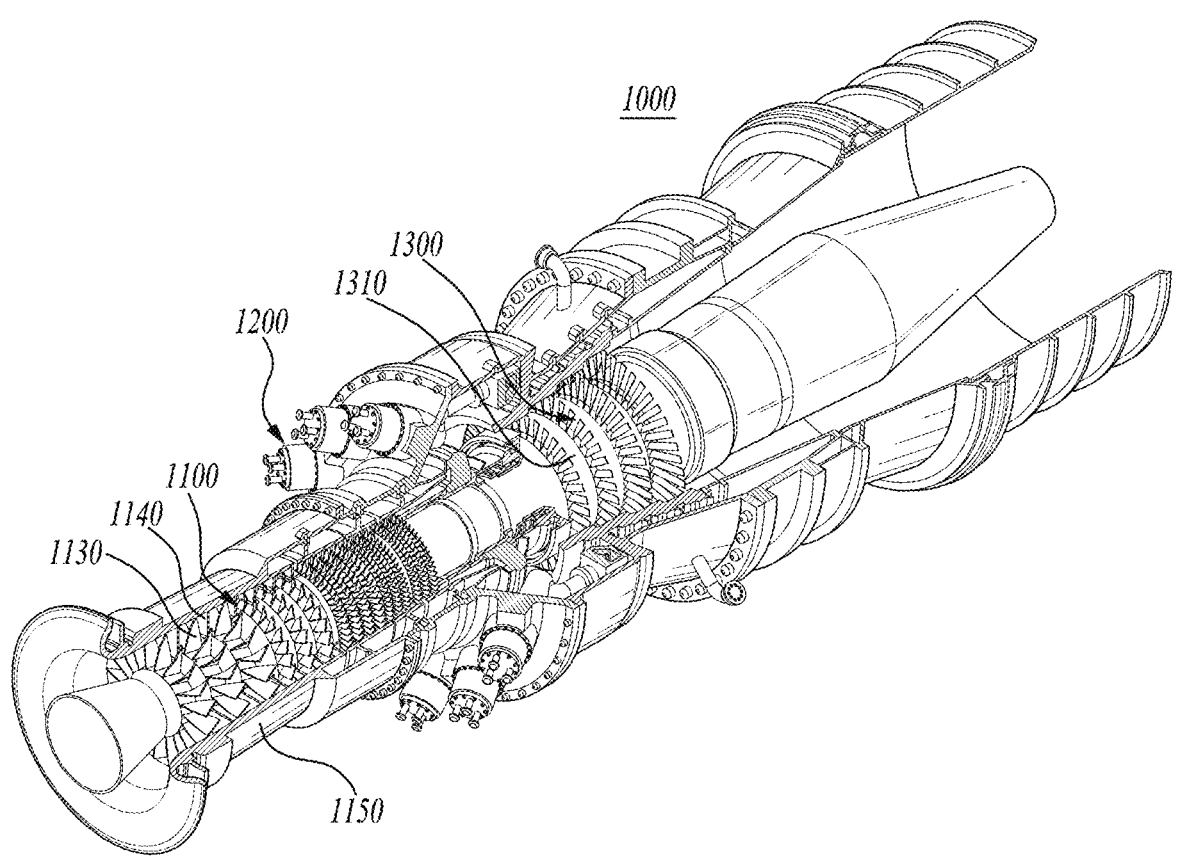
FIG. 1 is a diagram illustrating the interior of a gas turbine according to a first embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "including" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, preferred embodiments of the present disclosure will be described in detail with reference to the accompanying drawings.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Hereinafter, a gas turbine according to a first embodiment of the present disclosure will be described.

Figure 2:
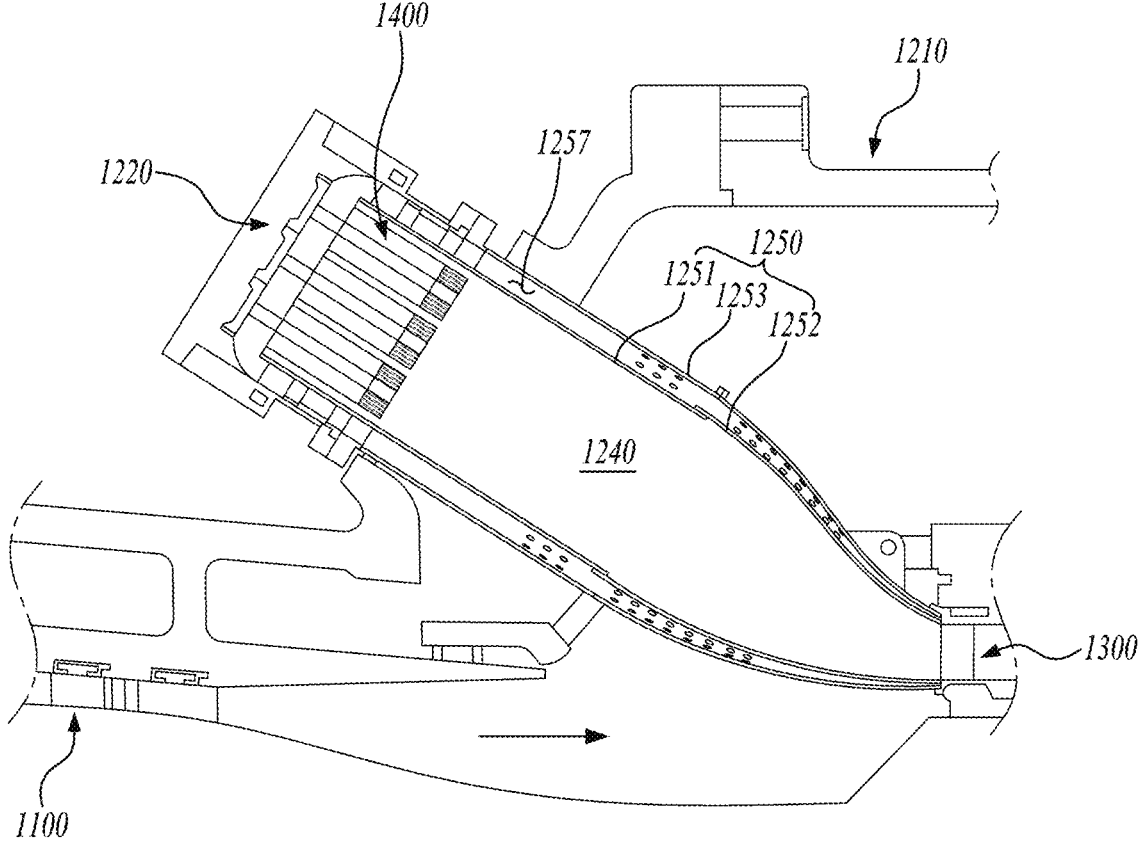
FIG. 2 is a cross-sectional diagram illustrating a combustor of FIG. 1.

FIG. 1 is a diagram illustrating the interior of a gas turbine according to a first embodiment of the present disclosure, and FIG. 2 is a cross-sectional diagram illustrating a combustor of FIG. 1.

An ideal thermodynamic cycle of a gas turbine 1000 according to the present embodiment follows a Brayton cycle. The Brayton cycle consists of four thermodynamic processes: isentropic compression (adiabatic compression), isobaric combustion, isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, and the centrifugal compressor is applied to a small-scale gas turbine, whereas a multi-stage axial compressor is applied to a large-scale gas turbine 1000 illustrated in FIG. 1 since the large-scale gas turbine 1000 is required to compress a large amount of air. In this case, in the multi-stage axial compressor, the compressor blades 1130 of the compressor 1100 rotate according to the rotation of the rotor disks to compress the introduced air and move the compressed air to the compressor vanes 1140 on the rear stage. As the air passes through the compressor blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side compressor blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, the rotary shaft of the compressor 1100 and the rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The turbine 1300 includes a rotor disk 1310 and a plurality of turbine blades and turbine vanes radially disposed on the rotor disk 1310. The rotor disk 1310 has a substantially disk shape on which a plurality of grooves is formed. The grooves are formed to have curved surfaces, and turbine blades and turbine vanes are inserted into the grooves. The turbine vanes are fixed against rotation and guide a flow of combustion gases through the turbine blades. The turbine blades are rotated by combustion gases to generate rotational force.

On the other hand, the combustor 1200 serves to mix the compressed air supplied from an outlet of the compressor 1100 with fuel and combust the mixture at constant pressure to produce hot combustion gases. FIG. 2 illustrates an example of the combustor 1200 provided in the gas turbine 1000. The combustor 1200 may include a combustor casing 1210, burners 1220, nozzles 1400, and a duct assembly 1240.

The combustor casing 1210 may have a substantially circular shape in which the burners 1220 are surrounded. The burners 1220 are disposed downstream of the compressor 1100 and may be disposed along the annular combustor casing 1210. Each burner 1220 is provided with a plurality of nozzles 1400, and fuel injected from the nozzles 1400 is mixed with air in an appropriate ratio to achieve a suitable state for combustion.

The gas turbine 1000 may use a gas fuel, in particular, a fuel containing hydrogen. The fuel may include a hydrogen fuel alone or a fuel containing hydrogen and natural gas.

The duct assembly 1250 is provided to connect the burners 1220 and the turbine 1300 so that the hot combustion gas flows therethrough to heat the duct assembly, whereas the compressed air flows towards the nozzles 1400 along an outer surface of the duct assembly 1250, thereby properly cooling the heated duct assembly 1250.

The duct assembly 1250 may include a liner 1251 and a transition piece 1252, and a flow sleeve 1253. The duct assembly 1250 has a double structure in which the flow sleeve 1253 surrounds the outside of the liner 1251 and the transition piece 1252, so that compressed air penetrates into an annular space inside the flow sleeve 1253 to cool the liner 1251 and the transition piece 1252.

The liner 1251 is a tube member connected to the burners 1220 of the combustor 1200, wherein an internal space of the liner 1251 defines the combustion chamber 1240. One side of the liner 1251 is coupled to the burner 1220 and the other side of the liner 1251 is coupled to the transition piece 1252.

The transition piece 1252 is in communication with an inlet of the turbine 1300 to guide the hot combustion gas toward the turbine 1300. One side of the transition piece 1252 is coupled to the liner 1251 and the other side of the transition piece 1252 is coupled to the turbine 1300. The flow sleeve 1253 serves to protect the liner 1251 and the transition piece 1252 while avoiding direct exhaust of hot air to the outside.

Figure 3:
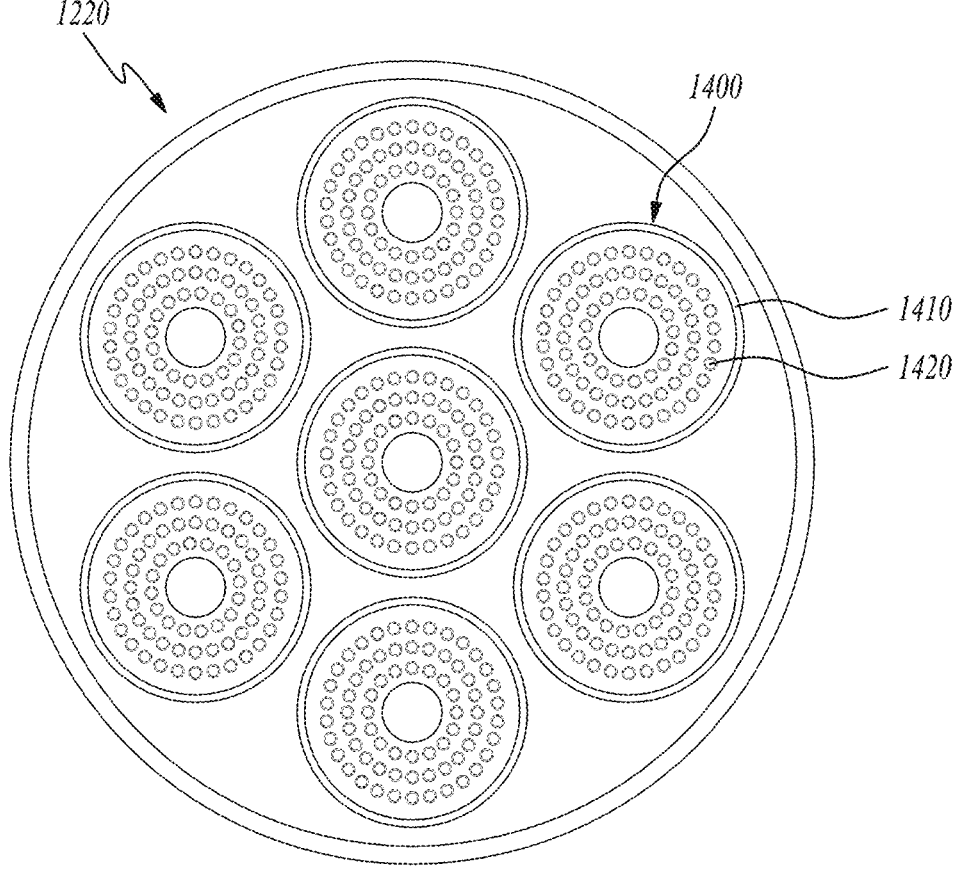
FIG. 3 is a front diagram illustrating a burner according to the first embodiment of the present disclosure.
Figure 4:
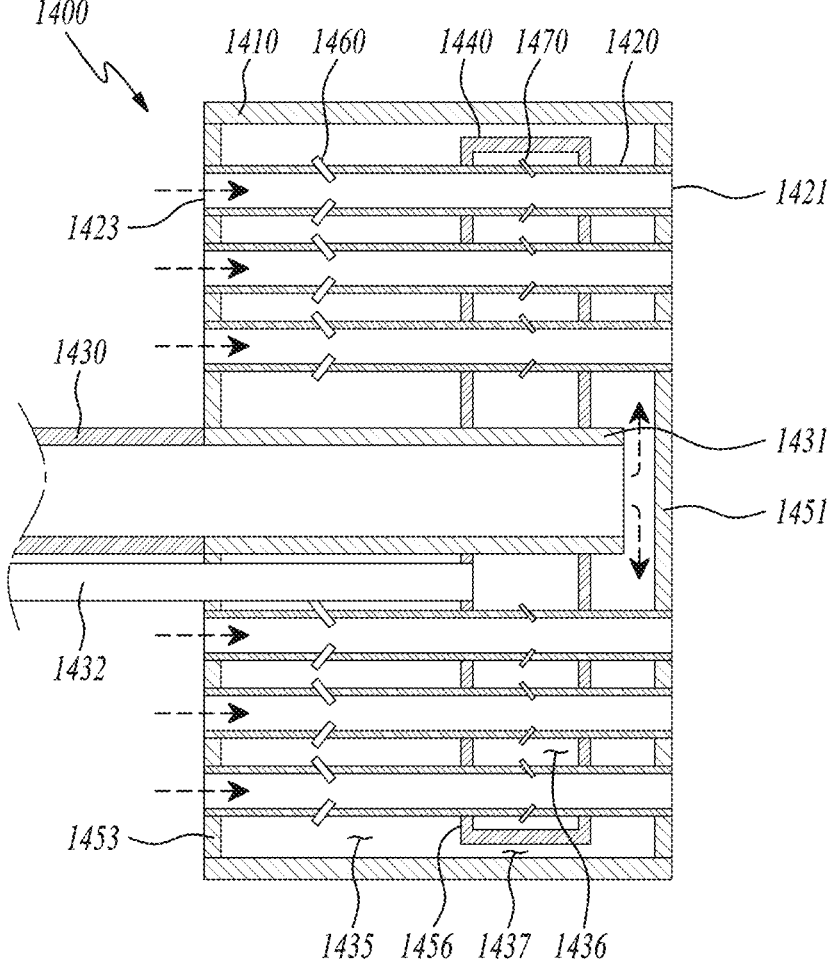
FIG. 4 is a longitudinal cross-sectional diagram illustrating a nozzle according to the first embodiment of the present disclosure.
Figure 5:
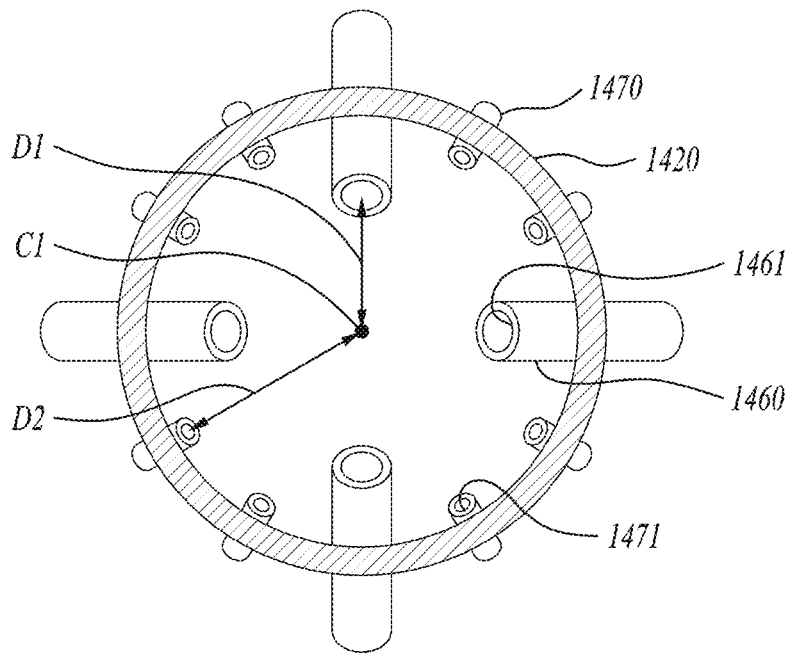
FIG. 5 is a radial cross-sectional diagram illustrating a mixing tube according to the first embodiment of the present disclosure.

FIG. 3 is a front diagram illustrating a burner according to the first embodiment of the present disclosure, FIG. 4 is a longitudinal cross-sectional diagram illustrating a nozzle according to the first embodiment of the present disclosure, and FIG. 5 is a radial cross-sectional diagram illustrating a mixing tube according to the first embodiment of the present disclosure.

Referring to FIGS. 3 to 5, the nozzle 1400 may include a plurality of mixing tubes 1420 through which air and fuel flow, a plurality of accommodation tubes 1410 each accommodating the mixing tubes 1420, first and second fuel tubes 1431 and 1432 installed inside the accommodation tube 1410, a tip plate 1451 coupled to a leading end of the accommodation tube 1410, and a dispersion chamber 1440 disposed in the accommodation tube.

The accommodation tube 1410 is cylindrical in shape, with a cavity formed therein. The nozzle 1400 may further include a fuel supply tube 1430 that supplies a first fuel to the accommodation tube 1410. Here, the first fuel may include a hydrogen-based fuel having hydrogen as a major component or a hydrocarbon-based fuel having hydrocarbon as a major component. The first fuel may also include a mixture of a hydrogen-based fuel and a hydrocarbon-based fuel.

As used herein, the hydrogen-based fuel means a fuel having a concentration of at least 70 wt % hydrogen, and the hydrocarbon-based fuel means a fuel having a concentration of at least 70 wt % hydrocarbon. The hydrocarbon-based fuel may include natural gas or the like.

The first fuel tube 1431 is disposed at the radial center of the accommodation tube 1410 to provide a space for the first fuel to flow. A first longitudinal end of the first fuel tube 1431 is connected to the fuel supply tube 1430 to receive fuel, and a second longitudinal end of the first fuel tube 1431 is connected to a first distribution space 1435 between the tip plate 1451 and a rear plate 1453 to supply fuel to the first distribution space 1435. Here, the first distribution space 1435 refers to the space formed inside the accommodation tube 1410.

Leading ends of the mixing tubes 1420 are inserted into the tip plate 1451.

The rear plate 1453 is secured to the rear end (upstream side) of the accommodation tube 1410 to define the first distribution space 1435 with the tip plate 1451. Rear ends of the mixing tubes 1420 may be inserted into the rear plate 1453.

The second fuel tube 1432 is radially spaced apart from the first fuel tube 1431 and is connected to the dispersion chamber 1440 to supply a second fuel to a second distribution space 1436 internally defined by the dispersion chamber 1440. Here, the second fuel may include a hydrocarbon-based fuel having hydrocarbon as a major component, in particular natural gas.

The dispersion chamber 1440 is disposed within the accommodation tube 1410 so as to be combined with the second fuel tube 1432 to receive fuel from the second fuel tube 1432. The plurality of mixing tubes 1420 and the first fuel tube 1431 pass through the dispersion chamber 1440.

The dispersion chamber 1440 may have a cylindrical shape and may be disposed between the tip plate 1451 and the rear plate 1453. The dispersion chamber 1440 may be disposed adjacent to the tip plate 1451 so that the rear end (upstream side) of the dispersion chamber 1440 is positioned further forward (downstream side) than the longitudinal center of the accommodation tube 1410.

On the other hand, a fuel passage 1437 is formed between the dispersion chamber 1440 and the inner circumferential wall of the accommodation tube 1410 through which the first fuel flows so that the first fuel flows rearwardly from the first distribution space 1435 through the fuel passage 1437.

Each mixing tube 1420 is formed to extend through the rear plate 1453, the dispersion chamber 1440, and the tip plate 1451. At the leading end of the mixing tube 1420, an outlet 1421 may be formed for fuel and air to exit, and at the trailing end of the mixing tube 1420, an inlet 1423 may be formed for air to enter.

The plurality of mixing tubes 1420 are distributed inside the accommodation tube 1410 to accommodate and mix fuel and air and inject the fuel-air mixture into the combustion space. The mixing tube 1420 is formed with a circular tube with a relatively small diameter to allow the fuel and air to be injected at high speed.

The mixing tube 1420 may be provided with a first fuel supply member 1460 that supplies a first fuel into the mixing tube 1420 and a second fuel supply member 1470 that supplies a second fuel into the mixing tube 1420.

The first fuel supply member 1460 is connected to the first distribution space 1435 to supply the first fuel from the first distribution space 1435 into the mixing tube 1420. The first fuel supply member 1460 may be tubular in shape and may slope forward (downstream) with respect to a radial direction of the mixing tube 1420 and protrude into the mixing tube 1420. The first fuel supply member 1460 may be located on the rear side (upstream side) of the dispersion chamber.

Two or more first fuel supply members 1460 may be circumferentially disposed on the mixing tube 1420 so as to be spaced apart from each other.

The second fuel supply member 1470 is tubular in shape and is connected to the second distribution space 1436 defined by the dispersion chamber 1440 to supply the second fuel from the second distribution space 1436 into the mixing tube 1420. Two or more second fuel supply members 1470 may be circumferentially disposed on the mixing tube 1420 so as to be spaced apart from each other. The second fuel supply member 1470 may extend so as to be inclined toward the downstream side of the mixing tube 1420.

The center of the outlet 1461 of the first fuel supply member 1460 may be spaced a first distance D1 from the center C1 of the mixing tube 1420, and the center of the outlet 1471 of the second fuel supply member 1470 may be spaced a second distance D2 from the center C1 of the mixing tube 1420. Here, the first distance D1 may be smaller than the second distance D2.

Accordingly, the outlet 1461 of the first fuel supply member 1460 is disposed closer to the center C1 of the mixing tube 1420 than the outlet 1471 of the second fuel supply member 1470, such that the first fuel may be injected toward the center portion of the mixing tube 1420 and the second fuel may be injected close to the wall surface of the mixing tube 1420. The first fuel is uniformly distributed inside the mixing tube 1420 and mixed with air to form a uniform fuel flow 1426 as illustrated in FIG. 8.

Figure 8:
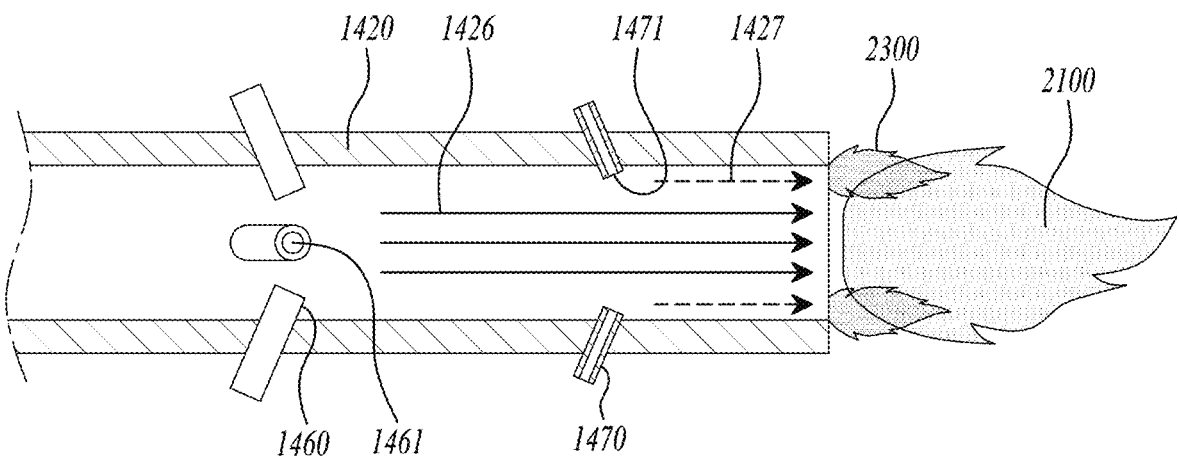
FIG. 8 is a diagram illustrating a flame formed by the mixing tube according to the first embodiment of the present disclosure.

The plurality of second fuel supply members 1470 may inject the second fuel at a location adjacent to the inner circumferential wall surface of the mixing tube 1420 to form an annular concentrated fuel flow 1427 (as illustrated in FIG. 8) flowing along the inner circumferential wall of the mixing tube 1420.

Thus, the second fuel may be concentrated and flows along the inner circumferential wall of the mixing tube 1420 without being dispersed. Further, the outlet 1471 of the second fuel supply member 1470 may be located further downstream of the outlet 1461 of the first fuel supply member 1460, such that the first fuel may be injected from the upstream side and mixed uniformly with air in the mixing tube 1420, while the second fuel may be injected toward the downstream side of the mixing tube 1420 and discharged in a concentrated state without being mixed with air.

Figure 6:
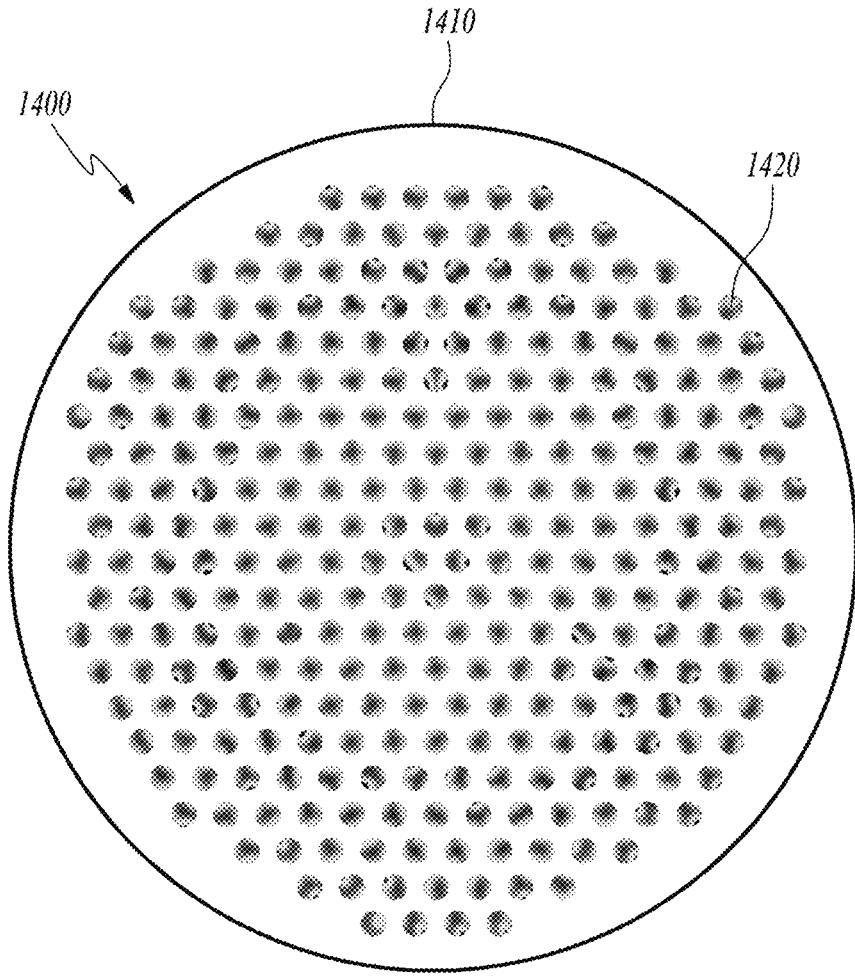
FIG. 6 is a diagram illustrating the concentration of fuel injected from an outlet of the nozzle according to the first embodiment of the present disclosure.
Figure 7:
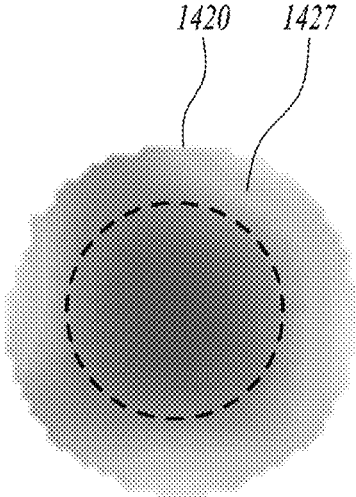
FIG. 7 is a diagram illustrating the concentration of fuel injected from one of the mixing tubes.

FIG. 6 is a diagram illustrating the concentration of fuel injected from an outlet of the nozzle according to the first embodiment of the present disclosure, FIG. 7 is a diagram illustrating the concentration of fuel injected from one of the mixing tubes, and FIG. 8 is a diagram illustrating a flame formed by the mixing tube according to the first embodiment of the present disclosure.

Referring to FIGS. 6 to 8, when the second fuel is injected into the mixing tube 1420 through the second fuel supply member 1470, a circumferentially outwardly concentrated annulus of fuel is formed at the portion of the outlet 1421 of the mixing tube 1420 adjacent to the inner circumferential wall due to the annular concentrated fuel flow 1427, as illustrated in FIGS. 6 and 7. In FIG. 7, the outer area is the area with the relatively high concentration of fuel, and the center area is the area with the relatively low concentration of fuel.

As illustrated in FIG. 8, if the first fuel is a hydrocarbon-based fuel such as natural gas, due to a lower combustion rate of the hydrocarbon-based fuel than hydrogen, a main flame 2100 may delaminate at the outlet of the nozzle. However, when a locally concentrated area of fuel is formed due to the concentrated fuel flow 1427, a secondary flame 2300 may be formed by the second fuel to anchor the main flame 2100 to the nozzle, preventing the flame from blowing away and maintaining a stable flame.

The first fuel may include hydrogen, natural gas, or a mixture of hydrogen and natural gas. If the first fuel is hydrogen, the second fuel may not be supplied through the second fuel supply member 1470 because the flame may remain stable even when the second fuel is not supplied. However, if the first fuel is a mixture of hydrogen and natural gas or a natural gas fuel, the second fuel needs to be supplied through the second fuel supply member 1470 to maintain a stable flame.

As described above, the present embodiment enables mixing and combustion of hydrocarbon-based fuel such as natural gas in the nozzle designed for combustion of hydrogen, and the flame is maintained by the second fuel regardless of the flow rate of the first fuel, so that the flow rate of the first fuel may be controlled to easily control occurrence of vibration and generation of carbon monoxide and nitrogen oxide.

Hereinafter, a nozzle according to a second embodiment of the present disclosure will be described.

Figure 9:
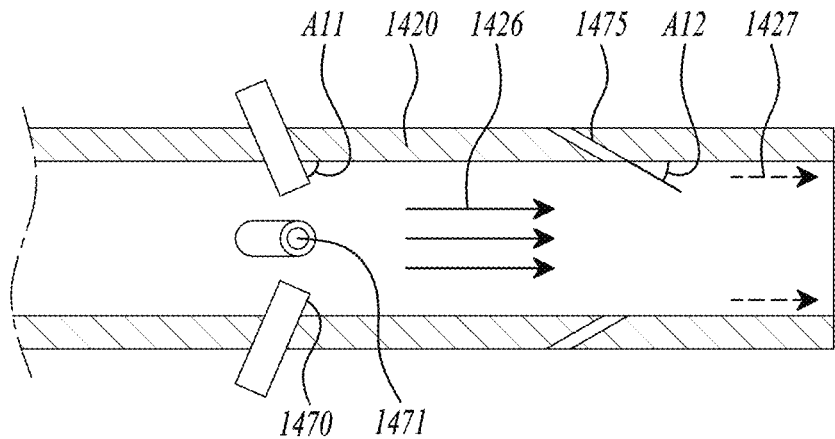
FIG. 9 is a longitudinal cross-sectional diagram illustrating a mixing tube according to a second embodiment of the present disclosure.

FIG. 9 is a longitudinal cross-sectional diagram illustrating a mixing tube according to a second embodiment of the present disclosure.

Referring to FIG. 9, the nozzle according to the second embodiment has the same structure as the nozzle according to the first embodiment described above, except for a second fuel supply member 1475, so a repeated description of the same configuration will be omitted.

The second fuel supply member 1475 is connected to the dispersion chamber to inject the second fuel into the mixing tube 1420. The second fueling member 1475 may include a hole formed in the mixing tube 1420, and two or more second fueling members 1475 may be circumferentially disposed on the mixing tube 1420 so as to be spaced apart from each other. The hole may extend so as to be inclined toward the downstream side of the mixing tube 1420.

Here, an inclination angle A12 of a longitudinal extension line of the second fuel supply member 1475 with the inner circumferential wall of the mixing tube 1420 may be formed to be smaller than that an inclination angle A11 of a longitudinal extension line of the first fuel supply member 1460 with the inner circumferential wall of the mixing tube 1420. The inclination angle A11 may range from 45 degrees to 90 degrees, and the inclination angle A12 may range from 45 degrees to 10 degrees.

Accordingly, the second fuel supply member 1475 may be formed to be more inclined toward the downstream side to facilitate the formation of an annular concentrated fuel flow 1427 as the fuel injected from the second fuel supply member 1475 flows along the inner circumferential wall of the mixing tube 1420.

The following describes a nozzle according to a third embodiment of the present disclosure.

Figure 10:
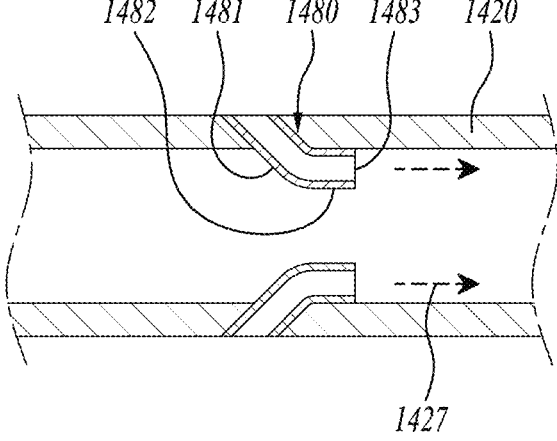
FIG. 10 is a longitudinal sectional diagram illustrating a mixing tube according to a third embodiment of the present disclosure.

FIG. 10 is a longitudinal sectional diagram illustrating a mixing tube according to a third embodiment of the present disclosure.

Referring to FIG. 10, the nozzle according to the third embodiment has the same structure as the nozzle according to the first embodiment described above, except for a second fuel supply member 1480, so a repeated description of the same configuration will be omitted.

The second fuel supply member 1480 is connected to a dispersion chamber to inject the second fuel into the mixing tube 1420. The second fuel supply member 1480 is tubular in shape, and two or more second fuel supply tubes 1480 may be circumferentially disposed on the mixing tube 1420 so as to be spaced apart from each other.

The second fuel supply member 1480 may include a first portion 1481 extending to be inclined downstream of the mixing tube 1420, and a second portion 1482 bent from the first portion 1481 toward the longitudinal direction of the mixing tube 1420.

The first portion 1481 may extend toward the radial center of the mixing tube at an inclination angle toward the downstream side of the mixing tube 1420. The second portion 1482 may extend in the longitudinal direction of the mixing tube 1420 so as to abut against the inner circumferential wall of the mixing tube 1420. An outlet 1483 of the second fuel supply member 1480 is formed at the second portion 1482, and the outlet 1483 may be disposed perpendicular to the longitudinal direction of the mixing tube 1420.

Accordingly, the second fuel injected from the second fuel supply member 2470 has only a velocity vector in the longitudinal direction of the mixing tube 1420 and may therefore stably form an annular concentrated fuel flow 1427 as the second fuel flows along the inner circumferential wall of the mixing tube 1420.

The following describes a nozzle according to a fourth embodiment of the present disclosure.

Figure 11:
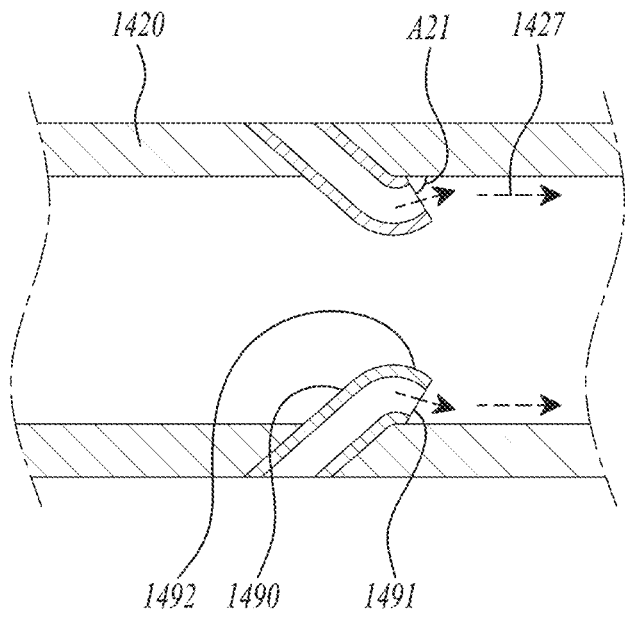
FIG. 11 is a longitudinal cross-sectional diagram illustrating the mixing tube according to a fourth embodiment of the present disclosure.

FIG. 11 is a longitudinal sectional diagram illustrating a mixing tube according to a fourth embodiment of the present disclosure.

Referring to FIG. 11, the nozzle according to the fourth embodiment has the same structure as the nozzle according to the first embodiment described above, except for a second fuel supply member 1490, so a repeated description of the same configuration will be omitted.

The second fuel supply member 1490 is connected to a dispersion chamber to inject the second fuel into the mixing tube 1420. The second fuel supply member 1490 is tubular in shape, and two or more second fuel supply tubes 1490 may be circumferentially disposed on the mixing tube 1420 so as to be spaced apart from each other.

At the leading end of the second fuel supply member 1490, a guide portion 1492 is formed for injecting the second fuel toward an inner circumferential wall of the mixing tube 1420. The guide portion 1492 is curved in an arc or inclined toward the inner circumferential wall of the mixing tube 1420 so as to induce the second fuel to form a flow toward the inner circumferential wall of the mixing tube 1420.

Accordingly, an outlet 1491 of the second fuel supply member 1490 is formed to be inclined at an inclination angle A21 with respect to the inner circumferential wall of the mixing tube 1420, wherein the inclination angle A21 may be an acute angle. The inclination angle A21 may range from 30 degrees to 80 degrees.

When the guide portion 1492 is formed on the second fuel supply member 1490 as in the fourth embodiment, the second fuel is injected toward the inner circumferential wall of the mixing tube 1420, so that a flow of the second fuel may be in close contact with the inner circumferential surface of the mixing tube 1420 to form a more concentrated fuel flow 1427.

While the embodiments of the present disclosure have been described, it will be apparent to those skilled in the art that various modifications and variations can be made in the present disclosure through addition, change, omission, or substitution of components without departing from the spirit of the present disclosure as set forth in the appended claims, and such modifications and changes may also be included within the scope of the present disclosure.

The invention claimed is:

1. A combustor nozzle comprising:
a plurality of mixing tubes through which air and fuel flow;
a plurality of accommodation tubes each accommodating the plurality of mixing tubes therein;
a first fuel tube coupled to each accommodation tube to supply a first fuel into the accommodation tube;
a second fuel tube coupled to each accommodation tube to supply a second fuel into the accommodation tube;
a dispersion chamber provided in each accommodation tube so as to be combined with the second fuel tube to receive the second fuel therein;
a first fuel supply member supplying the first fuel received in each accommodation tube into each mixing tube; and
a second fuel supply member supplying the second fuel received in the dispersion chamber into each mixing tube;
wherein the second fuel supply member comprises a tubular member having a first portion inclined downstream with respect to a radial direction of the mixing tube, a second portion bent from the first portion toward an inner circumferential wall of the mixing tube, and an outlet downstream of the first portion;
wherein an outlet end of the second fuel supply member is in direct contact with the inner circumferential wall of the mixing tube, and
wherein the outlet of the second fuel supply member is inclined at an angle of 30 degrees to 80 degrees with respect to the inner circumferential wall of the mixing tube.

2. The combustor nozzle according to claim 1, wherein the second fuel supply member forms a concentrated fuel flow flowing along the inner circumferential wall of the mixing tube with a higher concentration of fuel than a surrounding area.

3. The combustor nozzle according to claim 2, wherein two or more second fuel supply members are circumferentially provided on the mixing tube so as to be spaced apart from each other to form an annular concentrated fuel flow.

4. The combustor nozzle according to claim 3, wherein an outlet of the first fuel supply member is disposed closer to a center of the mixing tube than the outlet of the second fuel supply member.

5. The combustor nozzle according to claim 4, wherein the outlet of the second fuel supply member is located further downstream of the outlet of the first fuel supply member.

6. The combustor nozzle according to claim 3, wherein the first fuel comprises a hydrogen-based fuel having hydrogen as a major component or a hydrocarbon-based fuel having hydrocarbon as a major component, and the second fuel may include a hydrocarbon-based fuel having hydrocarbon as a major component.

7. A combustor comprising:
a burner having a plurality of nozzles through which fuel and air are injected; and
a duct assembly coupled to one side of the burner to allow the fuel and the air to be combusted therein and combustion gases to be transferred to a turbine, wherein each nozzle of the plurality of nozzles comprises:
a plurality of mixing tubes through which the air and the fuel flow;
a plurality of accommodation tubes each accommodating the plurality of mixing tubes therein;
a first fuel tube coupled to each accommodation tube to supply a first fuel into the accommodation tube;
a second fuel tube coupled to each accommodation tube to supply a second fuel into the accommodation tube;
a dispersion chamber provided in each accommodation tube so as to be combined with the second fuel tube to receive the second fuel therein;
a first fuel supply member supplying the first fuel received in each accommodation tube into each mixing tube; and
a second fuel supply member supplying the second fuel received in the dispersion chamber into each mixing tube;
wherein the second fuel supply member comprises a tubular member having a first portion inclined downstream with respect to a radial direction of the mixing tube, a second portion bent from the first portion toward an inner circumferential wall of the mixing tube, and an outlet downstream of the first portion;
wherein an outlet end of the second fuel supply member is in direct contact with the inner circumferential wall of the mixing tube, and
wherein the outlet of the second fuel supply member is inclined at an angle of 30 degrees to 80 degrees with respect to the inner circumferential wall of the mixing tube.

8. The combustor according to claim 7, wherein the second fuel supply member forms a concentrated fuel flow flowing along the inner circumferential wall of the mixing tube with a higher concentration of fuel than a surrounding area, wherein two or more second fuel supply members are circumferentially provided on the mixing tube so as to be spaced apart from each other to form an annular concentrated fuel flow.

9. The combustor according to claim 8, wherein an outlet of the first fuel supply member is disposed closer to a center of the mixing tube than the outlet of the second fuel supply member.

10. The combustor according to claim 9, wherein the outlet of the second fuel supply member is located further downstream of the outlet of the first fuel supply member.

11. The combustor according to claim 8, wherein the first fuel comprises a hydrogen-based fuel having hydrogen as a major component or a hydrocarbon-based fuel having hydrocarbon as a major component, and the second fuel may include a hydrocarbon-based fuel having hydrocarbon as a major component.

12. A gas turbine comprising:
a compressor compressing an externally introduced air to form a compressed air;
a combustor mixing the compressed air from the compressor with fuel to produce a mixture and combusting the mixture; and a turbine having a plurality of turbine blades rotated by combustion gases from the combustor, wherein the combustor comprises:

a burner having a plurality of nozzles through which the fuel and the compressed air are injected; and a duct assembly coupled to one side of the burner to allow the fuel and the compressed air to be combusted therein and combustion gases to be transferred to the turbine, wherein each nozzle of the plurality of nozzles comprises:

a plurality of mixing tubes through which the compressed air and the fuel flow;

a plurality of accommodation tubes each accommodating the plurality of mixing tubes therein;

a first fuel tube coupled to each accommodation tube to supply a first fuel into the accommodation tube;

a second fuel tube coupled to each accommodation tube to supply a second fuel into the accommodation tube;

a dispersion chamber provided in each accommodation tube so as to be combined with the second fuel tube to receive the second fuel therein;

a first fuel supply member supplying the first fuel received in each accommodation tube into each mixing tube; and a second fuel supply member supplying the second fuel received in the dispersion chamber into each mixing tube;

wherein the second fuel supply member comprises a tubular member having a first portion inclined downstream with respect to a radial direction of the mixing tube, a second portion bent from the first portion toward an inner circumferential wall of the mixing tube, and an outlet downstream of the first portion;

wherein an outlet end of the second fuel supply member is in direct contact with the inner circumferential wall of the mixing tube, and wherein the outlet of the second fuel supply member is inclined at an angle of 30 degrees to 80 degrees with respect to the inner circumferential wall of the mixing tube.

* * * * *